(12) United States Patent
Mangat et al.

(10) Patent No.: US 12,637,228 B2
(45) Date of Patent: May 26, 2026

(54) VENT SYSTEM

(71) Applicants: Airbus Operations Limited, Bristol (GB); Airbus (S.A.S.), Blagnac (FR); Airbus Operations (S.A.S.), Toulouse (FR)

(72) Inventors: Vikram Singh Mangat, Bristol (GB); Eric Greco, Blagnac (FR); Emmanuel Fesselier, Blagnac (FR); Pierre Wolf, Toulouse (FR); Haziq Noah, Bristol (GB)

(73) Assignees: Airbus Operations Limited, Bristol (GB); Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 1 day.

(21) Appl. No.: 18/812,481

(22) Filed: Aug. 22, 2024

(65) Prior Publication Data

US 2025/0066034 A1     Feb. 27, 2025

(30) Foreign Application Priority Data

Aug. 23, 2023    (GB) ..................................... 2312885

(51) Int. Cl.
B64D 37/16        (2006.01)
B64D 37/00        (2006.01)
          (Continued)

(52) U.S. Cl.
CPC ........... B64D 37/16 (2013.01); B64D 37/005 (2013.01); B64D 37/06 (2013.01); B64D 37/10 (2013.01);
          (Continued)

(58) Field of Classification Search
CPC ...... B64D 37/16; B64D 37/005; B64D 37/06; B64D 37/10; B64D 37/14; B64D 37/32;
          (Continued)

(56) References Cited

U.S. PATENT DOCUMENTS 2,760,342 A * 8/1956 Morrison .................. F17C 9/04
                                                          137/99
3,121,999 A   2/1964 Kasbohm
          (Continued)

FOREIGN PATENT DOCUMENTS

JP          H11351554 A   12/1999
WO          2008144273 A1  11/2008

OTHER PUBLICATIONS

Combined Search and Examination Report for GB Application No. 2312885.3, issued Jan. 18, 2024, 6 pages.
          (Continued)

*Primary Examiner* — Minh Q Le
(74) *Attorney, Agent, or Firm* — KDW Firm PLLC

(57)          ABSTRACT

A vent system includes a vent stack for venting a tank fluid from a fuel tank that is external to the vent stack, during fuelling of the fuel tank. The vent stack includes a conduit including a conduit inlet and a conduit outlet, the conduit outlet opening to atmosphere external to the conduit. The vent stack also includes an opening into the conduit between the conduit inlet and the conduit outlet. The opening is fluidically connected, or connectable, to the fuel tank so the tank fluid from the fuel tank flows through the opening to the conduit outlet, in use. The vent stack also includes a fluid mover operable to cause a mixer fluid receivable in the conduit inlet to flow through the conduit towards the conduit outlet, thereby to mix the mixer fluid with the tank fluid in the conduit, upstream of the conduit outlet.

20 Claims, 2 Drawing Sheets

(51) Int. Cl.

| | |
|---|---|
| *B64D 37/06* | (2006.01) |
| *B64D 37/10* | (2006.01) |
| *B64D 37/14* | (2006.01) |
| *B64D 37/32* | (2006.01) |
| *B67D 7/32* | (2010.01) |
| *F02C 7/22* | (2006.01) |
| *F17C 6/00* | (2006.01) |
| *F17C 7/00* | (2006.01) |
| *F17C 9/00* | (2006.01) |
| *F17C 13/12* | (2006.01) |

(52) U.S. Cl.
CPC .............. *B64D 37/14* (2013.01); *B64D 37/32* (2013.01); *B67D 7/3227* (2013.01); *F02C 7/22* (2013.01); *F17C 6/00* (2013.01); *F17C 7/00* (2013.01); *F17C 9/00* (2013.01); *F17C 13/12* (2013.01); *F17C 2205/0332* (2013.01); *F17C 2221/012* (2013.01); *F17C 2223/0161* (2013.01); *F17C 2223/035* (2013.01); *F17C 2223/046* (2013.01); *F17C 2225/0161* (2013.01); *F17C 2225/033* (2013.01); *F17C 2225/046* (2013.01); *F17C 2250/032* (2013.01); *F17C 2250/043* (2013.01); *F17C 2260/042* (2013.01); *F17C 2265/065* (2013.01); *F17C 2270/0139* (2013.01)

(58) Field of Classification Search
CPC ........ F17C 2205/0332; F17C 2221/012; F17C 2223/0161; F17C 2223/035; F17C 2223/046; F17C 2225/0161; F17C 2225/033; F17C 2225/046; F17C 2250/032; F17C 2250/043; F17C 2260/042; F17C 2265/065; F17C 2270/0139; F17C 6/00; F17C 9/00; F17C 13/12; F17C 7/00; F02C 7/22; B67D 7/3227

USPC ......................................................... 137/589
See application file for complete search history.

(56)     References Cited

U.S. PATENT DOCUMENTS

| | | | |
|---|---|---|---|
| 3,318,223 | A | 5/1967 | Maher |
| 3,592,122 | A | 7/1971 | Hughes |
| 3,710,549 | A | 1/1973 | Nichols |
| 6,174,351 | B1 | 1/2001 | McDowell |
| 6,426,158 | B1 | 7/2002 | Pratt |
| 7,018,287 | B2 * | 3/2006 | Kupferberg ........... F23L 17/005 454/40 |
| 7,275,569 | B2 | 10/2007 | Hobbs |
| 9,114,886 | B2 | 8/2015 | Gupta |
| 10,243,227 | B2 | 3/2019 | Jung |
| 10,495,258 | B2 | 12/2019 | Unno |
| 10,710,739 | B2 | 7/2020 | Filangi |
| 2005/0132745 | A1 | 6/2005 | Haberbusch |
| 2007/0029330 | A1 * | 2/2007 | Immel .............. H01M 8/04216 220/560.04 |
| 2013/0312871 | A1 | 11/2013 | Hoffjann |
| 2018/0251366 | A1 | 9/2018 | Dahm |
| 2022/0021316 | A1 * | 1/2022 | Fan ..................... B60L 15/2045 |
| 2022/0136876 | A1 * | 5/2022 | Jensen ................... B64D 37/32 702/47 |
| 2022/0182000 | A1 * | 6/2022 | Yamada ............. H02P 23/0004 |
| 2022/0302477 | A1 | 9/2022 | Landolt |
| 2024/0134425 | A1 * | 4/2024 | Curtis ....................... G06F 1/20 |
| 2024/0263745 | A1 * | 8/2024 | Sasaki ................... B64D 37/10 |

OTHER PUBLICATIONS

Extended European Search Report for EP Application No. 24195991. 5, dated Dec. 20, 2024, 11 pages.

* cited by examiner

VENT SYSTEM

TECHNICAL FIELD

The disclosure herein relates to vent systems for fuel tanks, fuelling systems, and methods of venting fluids from fuel tanks. The fuel tanks may be aircraft fuel tanks.

BACKGROUND

Aircraft fuel systems typically comprise fuel tanks and vents for expelling fluid from the fuel tank to atmosphere external to the fuel tank. Such a fluid may comprise air or gaseous fuel in the fuel tank, and may be vented to adjust a pressure in the fuel tank. For instance, as an external pressure reduces during a climbing phase of a flight of the aircraft, pressure in the fuel tank may be relieved by expelling fluid from the fuel tank to the atmosphere through the vent. Pressure may also be relieved during fuelling of the tank. This may release gas in the tank to make room for liquid fuel being supplied to the tank.

SUMMARY

A first aspect of the disclosure herein provides a vent system comprising a vent stack for venting a tank fluid from a fuel tank that is external to the vent stack, during fuelling of the fuel tank. The vent stack comprises: a conduit comprising a conduit inlet and a conduit outlet, the conduit outlet opening to atmosphere external to the conduit; an opening into the conduit between the conduit inlet and the conduit outlet, the opening fluidically connected, or connectable, to the fuel tank so that the tank fluid from the fuel tank flows through the opening to the conduit outlet, in use; and a fluid mover operable to cause a mixer fluid receivable in the conduit inlet to flow through the conduit towards the conduit outlet, thereby to mix the mixer fluid with the tank fluid in the conduit, upstream of the conduit outlet.

In this way, an outlet fluid expelled from the conduit outlet into the atmosphere comprises a mixture of the mixer fluid and the tank fluid. The outlet fluid may thereby comprise a lower concentration of a component of the tank fluid relative to the tank fluid received through the opening. In other words, mixing of the mixer fluid and the tank fluid upstream of the conduit outlet dilutes the component of the tank fluid in the mixer fluid before it is expelled into the atmosphere. This may be particularly beneficial when the component is a flammable component, such as when the tank fluid comprises fuel, such as gaseous fuel. In that case, reducing the concentration of the flammable fluid by mixing the tank fluid with the mixer fluid upstream of the outlet may reduce a likelihood of burning of the outlet fluid when it is expelled into the atmosphere. This may, in turn, improve a safety of the vent stack, which may allow the vent stack to be located in closer proximity to personnel than if the tank fluid were to be vented directly to the atmosphere without such mixing with the mixer fluid in the conduit upstream of the outlet.

Optionally, the conduit inlet is open to the atmosphere external to the conduit. In this way, the mixer fluid may comprise the atmosphere, such as air, surrounding the conduit. As such, the vent system may be configured to mix the tank fluid with air in the conduit upstream of the conduit outlet. Optionally, the tank fluid comprises gaseous fuel from an ullage space of the fuel tank. The gaseous fuel in the ullage space may increase in pressure as fuel is supplied to the fuel tank during fuelling of the fuel tank. This gaseous fuel may therefore be expelled from the fuel tank via the opening and mixed with the mixer fluid, such as air, in the conduit to reduce a flammability of the fuel before it is expelled into the atmosphere via the conduit outlet.

Optionally, the fuel tank is configured to store hydrogen fuel, such as hydrogen fuel for an engine of an aircraft. Optionally, the gaseous fuel is gaseous hydrogen fuel, which may readily react with oxygen in the atmosphere external to the conduit. By mixing the hydrogen fuel with air in the conduit, any initial reaction between the hydrogen fuel and oxygen in the air also occurs in the conduit. As the hydrogen fuel is further mixed with the air in the conduit, a concentration of the hydrogen fuel in the mixture is reduced. This may provide a region within the conduit, upstream of the conduit outlet, in which the hydrogen fuel/air mixture may combust. This, in turn, may provide a safer way to vent gaseous hydrogen fuel from the fuel tank than, for example, expelling the hydrogen fuel directly into atmosphere external to the fuel tank.

Optionally, a cross-sectional area of the opening is smaller than a cross-section area of the conduit inlet. In this way, a greater volume flow may be more readily achieved through the conduit inlet than through the opening.

Optionally, the fluid mover is a first fluid mover, and the vent system comprises one or more further fluid movers, the, or each, further fluid mover operable to cause the mixer fluid receivable in the conduit inlet to flow through the conduit towards the conduit outlet, thereby to mix the mixer fluid with the tank fluid in the conduit, upstream of the conduit outlet. Optionally, the fluid mover comprises a fan. Optionally, the, or each, further fluid mover comprises a fan. Optionally, the fluid mover is located in the conduit downstream of the conduit inlet. Optionally, the, or each, further fluid mover is located in the conduit downstream of the conduit inlet.

Optionally, the, or each, further fluid mover is configured to provide a volume flow rate equal, or substantially equal, to that of the first fluid mover described above. In this way, in the event of a failure of one of the fluid movers, another one of the fluid movers may be capable of providing a volume flow of the mixer fluid that reduces a concentration of the component in the outlet fluid to below the lower flammability limit (LFL) for that component. This may provide improved redundancy, and/or may improve a performance of the vent system when each of the fluid movers is operated simultaneously.

Optionally, the vent stack comprises geometry configured to impart turbulence into the mixer fluid upstream of the opening. Such geometry may improve mixing of the mixer fluid in the conduit upstream of the conduit outlet.

At least a part of the geometry is located in the conduit upstream of the opening. Optionally, the geometry is located in the conduit entirely upstream of the opening. By locating part, or all, of the geometry upstream of the opening, exposure of the geometry to the mixture of the mixer fluid and the tank fluid in the conduit at, or downstream of, the outlet may be reduced or eliminated. This may, in turn, increase a longevity of the geometry, particularly when the mixture is flammable, or where a flame may be present in the conduit downstream of the opening.

At least a part of the geometry may be located in the conduit downstream of the opening. By locating the at least a part of the geometry in the conduit downstream of the opening, the geometry may continue to impart turbulence into the mixture of the mixer fluid and the tank fluid downstream of the opening, which may improve a level of mixing of the mixer fluid and the tank fluid in the conduit.

Optionally, at least a part of an inner wall of the conduit downstream of the opening comprises a zone having a higher thermal resistance than another part of the inner wall. Optionally, the at least a part of the inner wall comprises a thermally insulating material defining the zone. Optionally, the conduit comprises a thermally insulating coating, or layer, on an inner surface of the conduit to define the zone.

Providing the zone with increased thermal resistance may allow the conduit to accommodate a flame downstream of the opening, which may occur when the (flammable) component of the tank fluid (such as hydrogen fuel) first encounters the mixer fluid (such as air). A flame in a cross-flow of the mixing fluid has a lower emissivity than a flame in a static atmosphere. As such, providing the opening in the conduit so that the tank fluid is entrained in a cross-flow of the mixer fluid, in use, may reduce an amount of heat radiated by such a flame compared, for example, to a flame produced by venting hydrogen directly into the atmosphere external to the fuel tank. Moreover, the presence of a flame in the conduit may further reduce a concentration of the component of the tank fluid in the mixture of the tank fluid and the mixer fluid in the conduit downstream of the opening, such as due to combustion of the component, or increased mixing due to turbulence generated by the flame. This may, in turn, reduce a likelihood of a flame being present at, or downstream of, the conduit outlet, which may improve a safety of the vent stack. The thermally insulating material may allow the conduit to better withstand heat generated by such a flame, thereby improving a longevity of the vent stack.

As noted above, mixing of the tank fluid and the mixer fluid in the conduit may ensure that such a flame only exists in a region of the conduit upstream of the conduit outlet and downstream of the opening, so that no flame is present at, or downstream of, the conduit outlet. This may improve a safety of the vent system. It will be appreciated that increasing a rate of mixing of the tank fluid and the mixer fluid in any way as described above may reduce a size of the region in which such a flame may exist, in use, which may in turn reduce an amount of thermally insulating material provided to thermally insulate the conduit in the region. This may reduce a cost and/or weight of the vent stack.

Optionally, the thermally insulating material extends at least partially circumferentially around the at least a part of the inner wall of the conduit. Optionally, the thermally insulating material extends axially along the at least a part of the inner wall of the conduit on one or both sides of the opening. Increasing an extent to which the thermally insulating material extends around the circumference of the conduit or axially either side of the opening, and particularly downstream of the opening, may improve the ability of the conduit to accommodate a flame in the region of the conduit upstream of the conduit outlet and downstream of the opening.

Optionally, at least a part of the opening is distanced from each part of an inner wall of the conduit by an amount that is greater than 20% of a minimum distance between opposing sides of the conduit. Optionally, the amount is greater than 30% of the minimum distance, such as greater than 40% of the minimum distance, such as up to 50% of the minimum distance. Optionally, the opening is located substantially centrally in the conduit.

Distancing the conduit opening from the sides of the inner wall may allow the tank fluid to better flow from the opening into a central portion of the conduit, in use. This may improve an amount or an evenness of mixing of the tank fluid and the mixer fluid in the conduit compared, for example, to an opening that is located in the inner wall. This may improve safety of the vent stack.

Optionally, the opening opens into the conduit in a direction at least partly towards the conduit outlet. This may better ensure that the tank fluid flows along the conduit towards the conduit outlet. This may, in turn, provide a more stable and/or predictable flame in the conduit downstream of the outlet. Optionally, the opening is substantially aligned with a central axis of the conduit, which may further ensure the tank fluid flows towards the outlet away from the opening. Optionally, the opening opens into the conduit in at least a partly tangential direction around the conduit. This may provide a tangential component to flow of the tank fluid from the opening, which may increase mixing in the conduit. Optionally, the opening opens in a substantially radial direction in the conduit. In this way, the mixer fluid may provide a shear force to the tank fluid leaving the opening, which may increase mixing in the conduit.

Optionally, the opening is a first opening, and the vent stack comprises one or more further openings into the conduit between the conduit inlet and the conduit outlet. Optionally, the, or each, further opening is fluidically connected, or connectable, to the fuel tank so that tank fluid from the fuel tank flows through the respective further opening to the conduit outlet, in use.

Providing plural such openings may allow the tank fluid to flow to different parts of the conduit simultaneously, which may improve a rate of mixing of the tank fluid with the mixer fluid in the conduit.

Optionally, the, or each, opening is defined at least in part by an aperture in a sidewall of a pipe in the conduit. Optionally, the pipe is configured to pass fluid from the fuel tank to the opening, or each further opening, where provided, in use. Optionally, the pipe is orientated in an axial direction of the conduit towards the conduit outlet so that one or more of the further openings opens substantially radially into the conduit. Optionally, the, or each further opening, where provided, is defined by a respective aperture in the sidewall of the pipe. The pipe may comprise plural such openings circumferentially and/or axially spaced around the sidewall of the pipe, such as in an array, to define the opening and respective further openings in the pipe.

Providing plural such openings may allow the tank fluid to be expelled in multiple directions in the conduit simultaneously, which may improve mixing in the conduit. Providing the opening and/or the one or more further openings as openings in a sidewall of a pipe may also provide a simple, relatively low-cost solution for passing the tank fluid from the fuel tank to the conduit.

Optionally, the opening and/or each of the further openings may be defined at least in part by a nozzle. Optionally, the, or each nozzle is configured to restrict a pressure and/or increase a velocity of the tank fluid expelled into the conduit from the opening, in use. Increasing the velocity of the expelled tank fluid may increase a rate of mixing of the mixer fluid and the tank fluid in the conduit.

Optionally, the conduit comprises a diffuser section between the opening and the conduit outlet, wherein the diffuser section increases in internal cross-sectional area with distance from the opening towards the conduit outlet. This may reduce a velocity and/or increase a pressure of the outlet fluid supplied to the conduit outlet. This may, in turn, reduce an operating noise of the vent stack.

Optionally, the vent system comprises a controller configured to: cause the tank fuel to move through the opening towards the conduit outlet; and simultaneously cause operation of the fluid mover to cause the mixer fluid to move through the conduit and mix with the tank fuel upstream of the conduit outlet.

The fuel tank vent system may comprise a supply valve fluidically connected, or connectable, between the fuel tank and the opening. The supply valve may be operable, such as by the controller, to fluidically connect the fuel tank to the conduit via the opening. Optionally, to cause the tank fuel to move through the opening towards the conduit outlet, the controller is configured to cause the fuel supply valve to open.

Optionally, the fuel tank is an aircraft fuel tank, and the vent stack is a ground-based vent stack that is connectable to the aircraft fuel tank via the opening during fuelling of the aircraft fuel tank. Providing such a vent stack that is discrete from the aircraft may allow the tank fluid, such as hydrogen fuel for the aircraft, to be vented to a location away from the aircraft and/or personnel working on the aircraft. This may improve a safety of the vent stack.

Optionally, the vent stack is mobile. For instance, the vent stack may comprise at least one locomotive component, such as wheels, rollers, and/or tracks. Providing a mobile vent stack may provide a versatile vent stack that can be relocated to a location of an aircraft. Optionally, the vent stack is a part of a fuelling system, such as a ground-based fuelling system, such as a mobile fuelling system. Providing such a mobile vent stack and/or fuelling system may provide a self-contained unit that can be used to refuel fuel tanks of multiple different aircraft, and/or may provide versatility in the location of such an aircraft.

A second aspect of the disclosure herein provides a fuelling system comprising: a fuel source connectable to the fuel tank to supply fuel to the fuel tank; and the vent system of the first aspect of the disclosure herein.

Optionally, the fuel source comprises a fuel outlet line that is connectable to the fuel tank to supply fuel to the fuel tank at the same time as the fuel tank is connected to the vent system. In this way, gaseous fuel, such as gaseous hydrogen fuel, in the fuel tank may be vented from the fuel tank while liquid fuel, such as liquid hydrogen fuel, is supplied to the fuel tank via the fuel outlet line. The fuelling system may therefore provide a self-contained unit for fuelling the fuel tank whilst safely removing unspent or residual fuel from the fuel tank.

A third aspect of the disclosure herein provides a method of venting a tank fluid from a fuel tank to atmosphere external to the fuel tank using a vent system. The vent system comprises: a conduit comprising a conduit inlet and a conduit outlet, the conduit outlet opening to the atmosphere external to the conduit; and an opening into the conduit between the conduit inlet and the conduit outlet, the opening fluidically connected, or connectable, to the fuel tank. The method comprises: causing the tank fluid to move from the fuel tank through the opening towards the conduit outlet; and simultaneously, causing a mixer fluid receivable in the conduit inlet to flow through the conduit towards the conduit outlet, thereby to mix the mixer fluid with the tank fluid in the conduit, upstream of the conduit outlet.

The vent system may be the vent system of the first aspect of the disclosure herein. It will be appreciated that the method may comprise and/or benefit from any of the optional features and/or advantages of the vent system of the first aspect of the disclosure herein and/or the fuelling system of the second aspect of the disclosure herein. For instance, the vent system may comprise the (or each) fluid mover, and the causing the mixer fluid receivable in the conduit inlet to flow through the conduit towards the conduit outlet may comprise causing operation of the (or one or more of) the fluid mover(s). Moreover, where the vent system comprises the supply valve, the causing the tank fluid to move from the fuel tank through the opening towards the conduit outlet may comprise causing the supply valve to open.

Optionally, the method comprises causing the mixer fluid to move through the conduit at a volume flow rate that is at least 25 times the volume flow rate of the tank fluid through the opening.

Optionally, the method comprises causing the mixer fluid to move through the conduit at a volume flow rate that is equal to or greater than 50 times, such as equal to or greater than 75 times, such as equal to or greater than 100 times, such as equal to or greater than 200 times, the volume flow rate of the tank fluid through the opening. A higher volume flow rate of the mixer fluid through the conduit relative to the volume flow rate of the tank fluid through the opening may provide greater mixing and/or dilution of the component of the tank fluid in the conduit upstream of the conduit outlet. As noted above, this may reduce a flammability of the outlet fluid when the component is a flammable component.

Optionally, the method comprises causing the mixer fluid to be passed through the conduit at a volume flow rate that causes the outlet fluid expelled from the conduit outlet to have a concentration of the component of the tank fluid that is up to 4% by volume, up to 2% by volume, such as up to 1% by volume, such as up to 0.5% by volume, such as up to 0.1% by volume, or lower than 0.05% by volume. This may be to cause the outlet fluid to have a concentration of the component that is less than the LFL of the component, where the component is a flammable component. For instance, when the component is hydrogen fuel, the volume flow rate of the mixer fluid may be such that the outlet fluid expelled from the conduit outlet has a concentration of the component of the tank fluid that is at least lower than 4% by volume, which is the approximate LFL of hydrogen. Providing a volume flow rate of the mixer fluid that causes a concentration of the component in the outlet fluid to be below the LFL of that component may improve a safety of the vent system.

Optionally, the method comprises causing operation of the or each fluid mover at particular speeds to provide such respective mass flow rates.

Optionally, the method is a computer-implemented method, such as a method that can be implemented by the controller of the vent system of the first aspect of the disclosure herein, where provided.

A fourth aspect of the disclosure herein provides a non-transitory computer-readable storage medium storing instructions that, when executed by a processor, cause the processor to perform the method of the third aspect of the disclosure herein.

Optionally, the vent system of the first aspect of the disclosure herein and/or the fuelling system of the second aspect of the disclosure herein comprises the non-transitory computer-readable storage medium. Optionally, the controller, where provided, comprises a processor configured to execute the instructions stored on the computer-readable storage medium.

It will be appreciated that the computer-readable storage medium of the fourth aspect of the disclosure herein may comprise and/or benefit from any of the optional features and/or advantages, respectively, of any one or more of the first to third aspects of the disclosure herein.

BRIEF DESCRIPTION OF THE DRAWINGS

Embodiments of the disclosure herein will now be described, by way of example only, with reference to the accompanying drawings, in which.

DETAILED DESCRIPTION

Figures 1, 3:
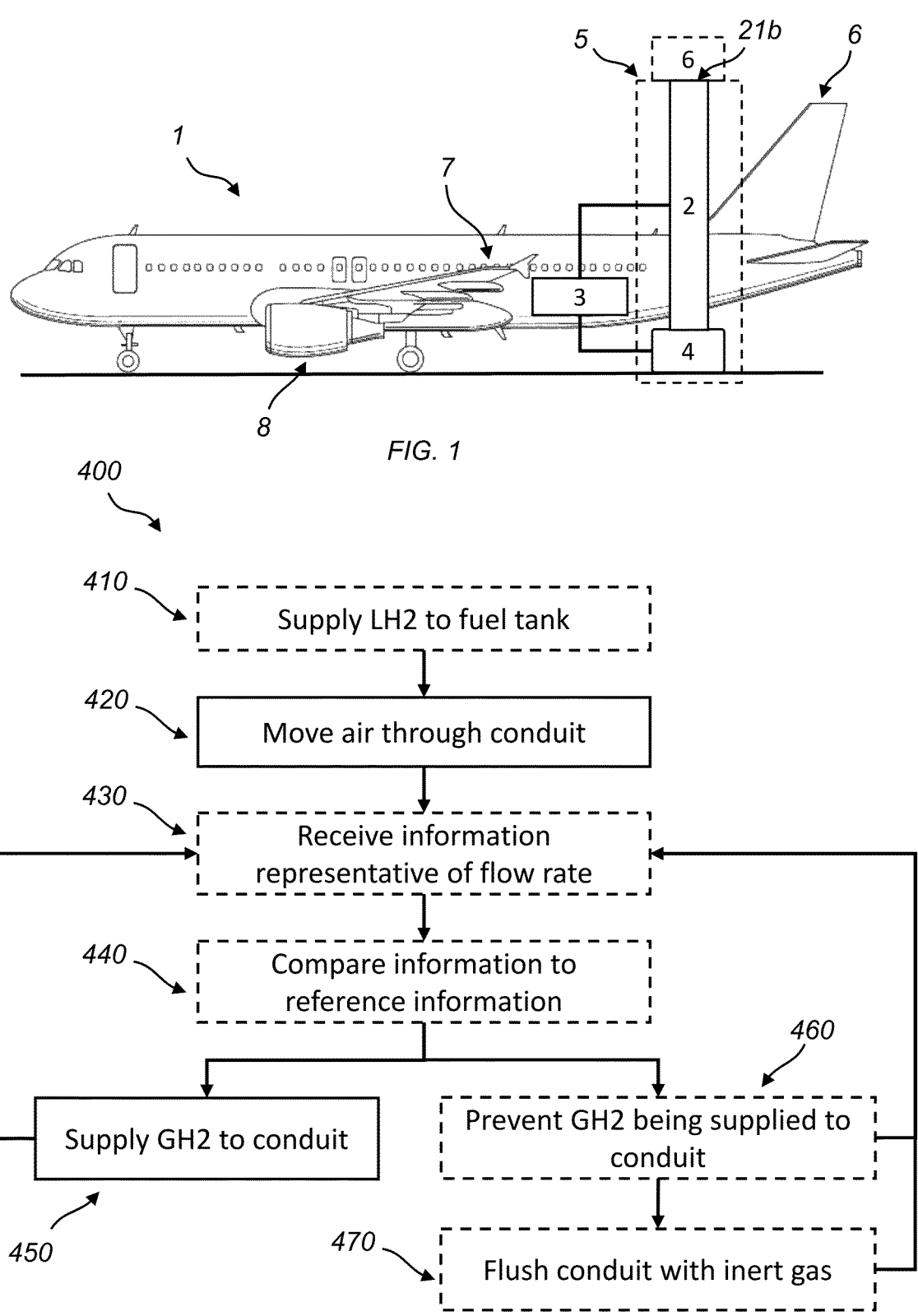
FIG. 1 shows a schematic view of an example aircraft and fuelling system.
FIG. 3 shows an example method of venting the fuel tank of the aircraft of FIG. 1.

FIG. 1 shows an example aircraft 1. The aircraft is shown on-ground and comprises a fuel tank 3 for storing and supplying fuel to an engine 8 of the aircraft 1. The fuel here is hydrogen fuel, which is specifically stored in the aircraft fuel tank 3 as cryogenic liquid hydrogen. It will be appreciated, however, that the disclosures herein similarly apply to fuel systems configured to store any other suitable type of fuel, such as conventional aviation fuel, such as kerosene. Moreover, while the fuel tank 3 is shown towards a rear of the aircraft 1, close to a tail 6 of the aircraft, the fuel tank 3 may in other examples be located in any other suitable location, such as centrally in the aircraft 1, and/or partly within wings 7 and/or a tail 6 of the aircraft 1.

Also shown in FIG. 1 is a fuelling system 5 comprising a fuel source 4 for supplying fuel to the fuel tank 3. The fuelling system 5 also comprises a vent system 2 for venting gaseous hydrogen in the fuel tank 3 to atmosphere 6 external to the fuel tank 3 via an outlet 21b of the vent system 2 during fuelling of the fuel tank 3 by the fuelling system 5. The fuelling system 5 is a ground-based mobile fuelling system, which can be moved to the aircraft 1 to permit a fuelling operation of the fuel tank 3. As shown in FIG. 1, the vent system 2 is constructed so that the outlet 21b of the vent system 2 is positioned higher than the highest point of the aircraft 1 when the aircraft 1 is on the ground adjacent to the vent system 2. This allows hydrogen fuel from the fuel tank 3 to be vented away from both personnel on the ground performing the fuelling operation (and/or other operations) and away from components of the aircraft 1, thereby improving a safety associated with use of the vent system 2.

Figure 2:
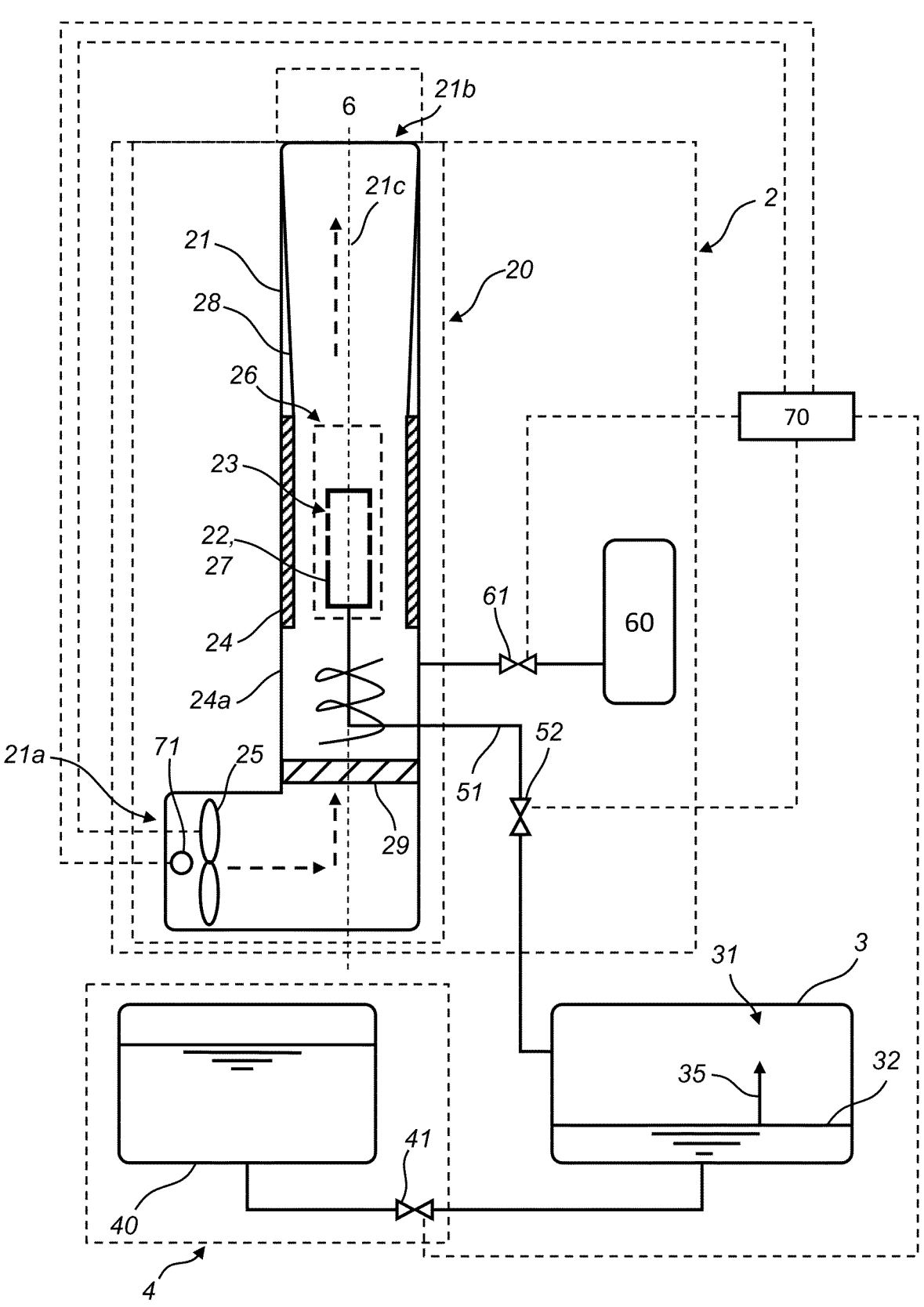
FIG. 2 shows a schematic view of an example fuelling system for fuelling a fuel tank of the aircraft of FIG. 1.

FIG. 2 shows a more detailed schematic representation of the fuelling system 5. The fuel supply 4 comprises a supply tank 40 that is fluidically connected, in use and as shown, to the fuel tank 3 via a fuel supply valve 41. The supply tank 40 contains pressurised liquid hydrogen fuel. When the fuel supply valve 41 is opened, the pressure in the supply tank 40 causes the liquid hydrogen fuel to move from the supply tank 40 to the fuel tank 3. This causes an increase in pressure in the fuel tank 3. The pressure in the fuel tank 3 is relieved by venting gaseous hydrogen fuel from an ullage space 31 of the fuel tank 3 to the atmosphere 6 external to the fuel tank 3 through the vent system 2. This allows a fuel level 32 in the fuel tank 3 to increase, as shown by the arrow labelled 35 in FIG. 2.

The vent system 2 comprises a vent stack 20 comprising a conduit 21 and a manifold 22 comprising six openings (collectively referred to with the reference numeral "23", for brevity) through a sidewall 27 thereof into the conduit 21. The openings 23 are shown in FIG. 2 as breaks in the sidewall 27 of the manifold 22. The manifold 22 itself is defined by an end of a pipe 51 fluidically connecting the openings 23 to the ullage space 31 in the fuel tank 3 via a tank gas valve 52 of the vent system 5. The tank gas valve 52 is opened during fuelling of the fuel tank 3 (i.e., when the fuel supply valve 41 is opened) to allow gas from the ullage space 31 to pass to the conduit 21 via the openings 23.

The conduit 21 comprises a conduit inlet 21a and a conduit outlet 21b, which is the outlet 21b of the vent system 2 mentioned above. The manifold 22 is located such that each opening 23 opens into the conduit 21 between the conduit inlet 21a and the conduit outlet 21b. The openings 23 are here spaced apart in an array extending around a circumference of the sidewall 27 of the manifold 22, but it will be appreciated that the openings 23 may, in other examples, be provided in any other suitable arrangement.

The vent stack 2 also comprises fans 25 that are operable to cause air external to the vent stack 2 to pass through the conduit 21 from the conduit inlet 21a to the conduit outlet 21b. While only one fan 25 is shown in FIG. 2, three such fans (referred to with the collective reference numeral "25", for brevity) are provided in the present example. It will be appreciated, however, that any other suitable number of fans 25, such as only one fan, two fans, or more than three fans, may be provided in other examples.

During fuelling of the fuel tank 3, gaseous hydrogen flowing into the conduit 21 through the openings 23 is entrained and mixed in air that is caused to move through the conduit 21 by the fans 25. This mixing occurs in a region 26 surrounding the openings 23. When the gaseous hydrogen fuel enters the conduit 21 and mixes with air in proximity to the openings 23, a concentration of the hydrogen fuel in a mixture of gaseous hydrogen and air in the region 26 is initially high. This can result in combustion of the mixture in proximity to the manifold 22 and/or the openings 23. For this reason, the vent stack 2 also comprises a layer 24 of thermally insulative material located on and extending circumferentially around an inner surface 24a of the conduit 1, to define a part of an inner wall of the conduit radially enclosing the region 26 and the manifold 22 within region 27. The thermally insulative material 24 extends axially, in a direction along an axis 21c of the conduit 21, to either side of the manifold 22. The thermally insulating material 24 thereby allows a flame to be maintained in proximity to the manifold 22, and particularly in the region 26, while increasing a longevity of the inner surface 24a of the conduit 21 and limiting temperature increases external to the conduit 21.

The fans 25 are operable at flow rates sufficient to ensure mixing of the hydrogen fuel and air in the conduit that causes the mixture of hydrogen and air to drop below its lower flammability limit (LFL) downstream of the region 26 and upstream of the conduit outlet 21b. In particular, each fan 25 is sized to provide a volume flow of air through the conduit 21 that is equal to or greater than 50 times, such as equal to or greater than 75 times, such as equal to or greater than 100 times, such as equal to or greater than 200 times, the volume flow rate of the hydrogen gas into the conduit 21 through the collective openings 23. This may cause a concentration of hydrogen gas in the mixture of hydrogen gas and air at the conduit outlet 21b to be up to 4% by volume, such as up to 2% by volume, such as up to 1% by volume, such as up to 0.5% by volume, such as up to 0.1% by volume, or lower than 0.05% by volume. This ensures that no flame is present at or downstream of the conduit outlet 21b, thereby improving a safety of the vent stack 2. A flame in a cross-flow has a lower heat emissivity than a flame in a static atmosphere. As such, it will be appreciated that increasing a volume flow rate, provided by the fans 25, of the cross-flowing air in the conduit 21 relative to the hydrogen gas flowing into the conduit 21 may reduce an amount of heat radiated by the flame present in the region 26, which may improve a safety of the vent system 2.

A vane system 29 is provided upstream of the manifold 22 and downstream of the fans 25 to passively increase an amount of turbulence imparted to the air that passes through the conduit 21. The vane system 29 comprises vanes orientated so as to impart a swirl component to the flow of air through the conduit 21, upstream of the openings 23 in the manifold 22. Such turbulent and/or swirling flow can increase a rate of mixing of the hydrogen fuel with the air in the region 26. It will be appreciated that mixing of the hydrogen fuel and air in the region 26 eventually causes the amount of hydrogen fuel in the mixture to reduce below the LFL of the mixture, as noted above, thereby preventing further burning of the mixture in the conduit 21. By increasing an amount of turbulence in the airflow, the vane system 29 increases the rate of mixing in the region 26, thereby more quickly reducing the concentration of hydrogen gas in the mixture to below the LFL for the mixture. It will be appreciated that, for ease of understanding, the vane system 29 illustrated in FIG. 2 is diagrammatical and is not representative of the actual structure of the vane system 29 and/or the vanes thereof. It will be appreciated that the vane system 29 may take any suitable form. It will also be appreciated that, in other examples, the vane system 29 may not be provided, and turbulence may be imparted into the airflow in any other suitable way.

The vent stack 2 also comprises a diffuser 28 located downstream of the manifold 22 and upstream of the conduit outlet 21*b*. The diffuser 28 comprises a portion of the conduit 21 that increases in cross-sectional area in a direction towards the conduit outlet 21*b*. In this way, the diffuser 28 increases a pressure and reduces a velocity of the air that is passed towards the outlet 21*b*, which in turn reduces noise emitted by the vent system 2, in use. In particular, the diffuser 28 is sized in relation to a flow rate provided by the fans 25 to reduce a velocity of the mixture of hydrogen fuel and air passing into the atmosphere 6 from the conduit outlet 21*b* to less than 10 m/s, such as less than 7 m/s, such as less than 5 m/s. By reducing the velocity and increasing the pressure in this way, the diffuser may also reduce a power required to operate the fans 25.

The vent stack 2 also comprises a pressure sensor 71 configured and arranged to sense a pressure at the conduit inlet 21*a* upstream of the fans 25. The pressure at the conduit inlet 21*a* is indicative of operation of the fans 25: as the fans 25 are operated, a pressure at the conduit inlet 21*a* reduces. If one or more of the fans 25 stops, or a performance of one or more of the fans 25 reduces, the pressure at the conduit inlet 21*a* will increase. In this way, the pressure sensor 71 permits a determination of the performance of one or more of the fans 25.

The vent system 2 also comprises an inert gas tank 60 fluidically connected to the conduit 21, upstream of the openings 23, via an inert gas valve 61. The inert gas tank 60 is a pressure vessel configured to store pressurised nitrogen gas. In the event of a failure of the vent system 2 that risks causing an increase in a concentration of hydrogen gas in the conduit 21 downstream of the region 26 to above the LFL of the mixture of hydrogen gas and air, the inert gas valve 61 can be opened to allow the nitrogen gas to flush the conduit 21. Such a failure may, for instance, comprise a failure of one or more of the fans 25 which causes a performance of the one or more fans 25 to reduce, or a failure of the tank gas valve 52 which causes the tank gas valve 52 to remain open. The inert gas tank 60 may therefore improve a safety of the vent system 2 by providing an alternative source of fluid with which the hydrogen gas from the tank can be mixed in the conduit 21.

As shown in FIG. 2, the vent system 5 comprises a controller 70 configured to perform a computer-implemented method 400, which is shown diagrammatically in FIG. 3. The controller is communicatively coupled to the fuel supply valve 41, the tank gas valve 52, the inert gas valve 61, the fans 25, and the pressure sensor 71.

The method 400 performed by the controller 70 comprises: causing 410 liquid hydrogen (LH2) fuel to be supplied to the fuel tank 3 from the fuel source 4, by causing the fuel supply valve 41 to open. The method 400 also comprises causing 420 gaseous hydrogen (GH2) fuel to move from the fuel tank 3 to the conduit 21, by causing the tank gas valve 52 to open.

As shown in FIG. 3, the method 400 performed by the controller 70 also comprises receiving 430 information from the pressure sensor 71 indicative of the flow rate of air in the conduit 21. The information here is a level of pressure at the conduit inlet 21*a*, which, as noted above, is indicative of a performance of the fans 25 and a flow rate of air in the conduit 21. The method 400 then comprises the controller 70 comparing 440 the information to reference information. In particular, the method 400 comprises the controller 70 comparing the pressure received from the pressure sensor 71 to a reference pressure. If the comparison indicates that the flow rate is high enough to sufficiently mix the gas with the airflow in the conduit, as discussed above, the method 400 then comprises the controller 70 causing 450 GH2 fuel from the fuel tank to be supplied to the conduit 21 by causing tank gas valve 52 to open. In this case, the flow rate is deemed to be sufficiently high when the pressure at the conduit inlet 21*a* is below the reference pressure.

The receiving 430 and comparing 440 the information is then repeated in a loop to allow the controller 70 to continuously monitor whether the mass flow rate of air through the conduit 21 is sufficiently high. If, at any time, the comparison indicates that the mass flow rate of air through the conduit 21 is insufficient (in this case, when the pressure at the conduit inlet 21*a* is at or above the reference pressure), the method 400 comprises the controller 70 preventing 460 the GH2 being supplied to the conduit 21 by causing the tank gas valve 52 to close. The method 400 here also comprises, in the event of a reduction in mass flow rate of air through the conduit 21, causing 470 inert gas from the inert gas tank 60 to be supplied to the conduit 21 by causing the inert gas valve 61 to open. This allows any hydrogen still present in the conduit following closure of the tank gas valve 52 to be flushed from the conduit using the inert gas. The causing 470 the inert gas to be supplied to the conduit 21 may be performed before, after, or simultaneously with the preventing 460 GH2 from being supplied to the conduit 21.

The receiving 430 and comparing 440 the information is then repeated again, following the preventing 460 GH2 being from being supplied to the conduit 21 and/or following the causing 470 the inert gas to be supplied to the conduit 21. In this way, the GH2 can once again be supplied to the vent conduit if the mass flow rate of air through the conduit 21 increases to a level that is deemed sufficient for proper mixing of the GH2 with the air in the conduit.

The controller 70 comprises a processor configured to execute instructions to cause the controller 70 to perform the method 400. The controller 70 comprises a non-transitory computer-readable storage medium storing instructions that, when executed by a processor of the controller 70, cause the processor to perform the method 400 described above.

In some examples, the manifold 23, in addition to or alternatively to the openings 23, may comprise any other suitable opening(s) into the conduit 21. For instance, the manifold may comprise any other number of openings, such as only one opening, up to six openings, or more than six openings. In other examples, where the manifold 23 comprises only a single other opening, the single or other opening may be a formed by a nozzle (not shown) that opens into the conduit 21. Alternatively, the manifold 22 may comprise the openings 23 through the sidewall 27 of the manifold 22 as well as the nozzle, defined at an end of the manifold 22, such as the end of the manifold 22 facing the conduit outlet 21*b* in FIG. 2.

It will be appreciated that, in other examples, the method 400 may instead be performed manually, such as by an operator manually causing operation of the fans 25 and/or the tank gas valve 52. Moreover, while the method 400 comprises receiving 430 a pressure signal from the pressure sensor 71 at the conduit inlet 21*a* to infer the performance of the fans 25 and/or the flow rate through the conduit 21, in other examples the performance of the fans 25 and/or the flow rate through the conduit 21 may be determined in any other suitable way. For instance, the controller 70 may be configured to receive information from one or more of the fans 25 representative of a speed of the respective one or more fans 25, and compare the fan speed to a reference fan speed. In this case, a drop in the speed of the respective one or more fans 25 may indicate a reduction in flow rate in the conduit 21, which may cause the tank gas valve 52 to close. Alternatively, or in addition, the controller 70 may receive information representative of a pressure and/or a flow rate downstream of one or more of the fans 25 in the conduit 21, and compare the pressure and/or flow rate to a respective reference pressure and/or reference flow rate. In other examples, the controller 70 may receive information representative of an amount of vibration of one or more of the fans 25, and use this to infer a speed of the respective one or more fans and/or a mass flow rate provided by the respective one or more fans 25. In some examples, the vent system 2 comprises a composition sensor (not shown) which obtains information representative of a composition of the mixture of air and hydrogen gas in the conduit 21. The composition of the mixture may be used to determine whether to open and/or close the tank gas valve 52 and/or the inert gas supply valve 61. Other ways of identifying a suitable flow rate through the conduit 21 will be evident to the skilled person. For instance, the conditions in the conduit, such as upstream of, downstream of, or within the region 26, may be inferred using any suitable parameter of the flow of hydrogen gas and/or air through the conduit 21, such as pressure, temperature, composition, flow rate, or vibration.

It is to be noted that the term "or" as used herein is to be interpreted to mean "and/or", unless expressly stated otherwise.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vent system comprising:
   a vent stack for venting a tank fluid from a fuel tank that is external to the vent stack, during fueling of the fuel tank, the vent stack comprising:
      a conduit comprising a conduit inlet and a conduit outlet, the conduit outlet opening to atmosphere external to the conduit;
      an opening into the conduit between the conduit inlet and the conduit outlet, the opening fluidically connected, or connectable, to the fuel tank so that the tank fluid from the fuel tank flows through the opening to the conduit outlet, in use; and
      a first fluid mover operable to cause a mixer fluid receivable in the conduit inlet to flow through the conduit towards the conduit outlet, thereby to mix the mixer fluid with the tank fluid in the conduit, upstream of the conduit outlet; and
   one or more further fluid movers, each of which is operable to cause the mixer fluid receivable in the conduit inlet to flow through the conduit towards the conduit outlet, thereby mixing the mixer fluid with the tank fluid in the conduit, the mixing of the mixer fluid with the tank fluid occurring upstream of the conduit outlet.

2. The vent system of claim 1, wherein the vent stack comprises a vane system configured to impart turbulence into the mixer fluid upstream of the opening.

3. The vent system of claim 1, wherein at least a part of an inner wall of the conduit downstream of the opening comprises a thermally insulating material.

4. The vent system of claim 1, wherein:
   the opening is defined at least in part by an aperture in a sidewall of a pipe in the conduit; and
   the aperture is distanced from each part of an inner wall of the conduit by an amount that is greater than 20% of a minimum distance between opposing sides of the conduit.

5. The vent system of claim 1, wherein;
   the opening is a first opening;
   the vent stack comprises one or more further openings into the conduit;
   each of the one or more further openings is between the conduit inlet and the conduit outlet; and
   wherein each further opening is fluidically connected to the fuel tank so that, in use, the tank fluid from the fuel tank flows through each such further opening to the conduit outlet.

6. The vent system of claim 5, wherein each of the one or more further openings is defined at least in part by an aperture in a sidewall of a pipe in the conduit.

7. The vent system of claim 1, wherein:
   the conduit comprises a diffuser section between the opening and the conduit outlet; and
   the diffuser section increases in internal cross-sectional area as a function of distance from the opening, in a direction towards the conduit outlet.

8. The vent system of claim 1, comprising a controller configured to simultaneously:
   cause a fuel supply valve to open to thereby cause the tank fuel to move through the opening towards the conduit outlet; and

cause operation of the first fluid mover and the one or more further fluid movers to cause the mixer fluid to move through the conduit and mix with the tank fuel upstream of the conduit outlet.

9. The vent system of claim 1, wherein:

the fuel tank is an aircraft fuel tank; and the vent stack is a ground-based vent stack that is connectable to the aircraft fuel tank via the opening during fuelling of the aircraft fuel tank.

10. A fuelling system comprising:

the vent system of claim 1; and a fuel source connectable to the fuel tank to supply fuel to the fuel tank.

11. The vent system of claim 1, wherein:

the opening is a first opening;

the vent stack comprises one or more further openings into the conduit;

each of the one or more further openings is between the conduit inlet and the conduit outlet; and wherein each further opening is fluidically connectable to the fuel tank so that, in use, the tank fluid from the fuel tank flows through each such further opening to the conduit outlet.

12. The vent system of claim 11, wherein each of the one or more further openings is defined at least in part by an aperture in a sidewall of a pipe in the conduit.

13. The vent system of claim 1, wherein at least one of the first fluid mover and the one or more further fluid movers is located in the conduit downstream of the conduit inlet.

14. A method of venting a tank fluid from a fuel tank to atmosphere external to the fuel tank using a vent system, the vent system comprising:

a vent stack comprising:

a conduit comprising a conduit inlet and a conduit outlet, the conduit outlet opening to the atmosphere external to the conduit;

an opening into the conduit between the conduit inlet and the conduit outlet, the opening fluidically connected, or connectable, to the fuel tank; and a first fluid mover; and one or more further fluid movers;

the method comprising simultaneously:

causing the tank fluid to move from the fuel tank through the opening towards the conduit outlet; and

operating the one or more further fluid movers to cause a mixer fluid receivable in the conduit inlet to flow through the conduit towards the conduit outlet, thereby mixing the mixer fluid with the tank fluid in the conduit, the mixing of the mixer fluid with the tank fluid occurring upstream of the conduit outlet.

15. The method of claim 14, wherein the mixer fluid flows through the conduit at a mass flow rate that is at least 25 times greater than a mass flow rate of the tank fluid through the opening.

16. A non-transitory computer-readable storage medium storing instructions that, when executed by a processor for operating a vent system, causes the processor to perform the method of claim 14.

17. The method of claim 14, wherein the vent stack comprises a vane system, the method comprising using the vane system to impart turbulence into the mixer fluid upstream of the opening.

18. The method of claim 14, wherein:

the opening is defined at least in part by an aperture in a sidewall of a pipe in the conduit; and the aperture is distanced from each part of an inner wall of the conduit by an amount that is greater than 20% of a minimum distance between opposing sides of the conduit.

19. The method of claim 14, wherein:

the opening is a first opening;

the vent stack comprises one or more further openings into the conduit;

each of the one or more further openings is between the conduit inlet and the conduit outlet; and wherein each further opening is fluidically connected to the fuel tank so that, in use, the tank fluid from the fuel tank flows through each such further opening to the conduit outlet.

20. The method of claim 14, wherein:

the conduit comprises a diffuser section between the opening and the conduit outlet; and the diffuser section increases in internal cross-sectional area as a function of distance from the opening, in a direction towards the conduit outlet.

\* \* \* \* \*